United States Patent
Yao

(10) Patent No.: US 7,343,100 B2
(45) Date of Patent: Mar. 11, 2008

(54) OPTICAL COMMUNICATIONS BASED ON OPTICAL POLARIZATION MULTIPLEXING AND DEMULTIPLEXING

(75) Inventor: X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 227 days.

(21) Appl. No.: 11/140,456

(22) Filed: May 27, 2005

(65) Prior Publication Data

US 2005/0265728 A1 Dec. 1, 2005

Related U.S. Application Data

(60) Provisional application No. 60/575,127, filed on May 28, 2004.

(51) Int. Cl.
*H04B 10/00* (2006.01)

(52) U.S. Cl. .................... 398/152; 398/33; 398/65; 398/184; 398/205; 398/206; 385/11; 385/27

(58) Field of Classification Search ............... 398/65, 398/152, 184, 205, 206
See application file for complete search history.

(56) References Cited

U.S. PATENT DOCUMENTS

| 6,577,413 B1 * | 6/2003 | Saunders ................ 398/65 |
| 6,678,431 B2 * | 1/2004 | Han et al. ................ 385/11 |
| 7,127,166 B2 * | 10/2006 | Glingener ................ 398/65 |
| 2004/0109220 A1 * | 6/2004 | Han et al. ................ 359/246 |
| 2005/0047780 A1 * | 3/2005 | Hoshida et al. ............ 398/33 |

OTHER PUBLICATIONS

A.R. Chraplyvy, et al.; 1-Tb/s Transmission Experiment; Sep. 1996; IEEE Photonics Technology Letters, vol. 8, No. 9, pp. 1264-1266.
M.I. Hayee, et al.; Doubling of Bandwidth Utilization Using Two Orthogonal Polarizations and Power Unbalancing in a Polarization-Division-Multiplexing Scheme; Aug. 2001; IEEE Photonics Technology Letters, vol. 13, No. 8, pp. 881-883.
F. Heismann, et al.; Automatic polarization demultiplexer for polarization-multiplexed transmission systems; Oct. 28, 1993; Electronics Letters, vol. 29, No. 22, pp. 1965-1966.
Paul Hill, et al.; Optical Polarization Division Multiplexing at 4 Gb/s; May 1992; IEEE Photonics Technology Letters, vol. 4, No. 5, pp. 500-502.

* cited by examiner

*Primary Examiner*—Kenneth Vanderpuye
*Assistant Examiner*—Phyowai Lin
(74) *Attorney, Agent, or Firm*—Fish & Richardson P.C.

(57) ABSTRACT

This application describes techniques for optical multiplexing and demultiplexing in optical communication systems based on polarization multiplexing of different signal channels.

20 Claims, 3 Drawing Sheets

OPTICAL COMMUNICATIONS BASED ON OPTICAL POLARIZATION MULTIPLEXING AND DEMULTIPLEXING

This application claims the benefit of U.S. Provisional Patent Application No. 60/575,127 entitled "Method and apparatus for polarization demultiplexing" and filed May 28, 2004. The entire disclosure of the above referenced application is incorporated herein by reference as part of the specification of this application.

BACKGROUND

This application relates to optical polarization and use of optical polarization in optical communications.

Optical polarization is an important parameter of an optical signal can be used in various optical devices and systems. In some applications, optical polarization may cause technical difficulties. For example, in fiber optic communication systems, polarization-dependent effects in fibers and other devices, such as the polarization-dependent loss (PDL), polarization-mode dispersion (PMD) and differential group delay (DGD), can adversely affect the performance and proper operations of optical devices or systems.

Optical polarization may also be used to benefit various applications. For example, two orthogonal polarized beams can be easily separated as in optical disk drives and many other optical devices and systems. In optical communication systems, two optical beams with mutually perpendicular linear polarizations may be used to carry two different optical channels and hence can be used to double the capacity of the information carried at a particular optical wavelength. This mechanism is essentially a polarization multiplexing technique and can be used in combination with the wavelength-division multiplexing (WDM) to double the capacity of a given WDM system. Implementations of such polarization multiplexing can be used to improve the capacity of existing WDM systems at a low cost in comparison with building new WDM systems to meet the demand for increased communication capacity.

SUMMARY

The state of polarization (SOP) of light, however, often fluctuates when transmitting through an optical transmission medium due to, e.g., inherent optical birefringence in the medium or induced optical birefringence caused by the surrounding conditions of the media (such as stresses). Many commercial optical fibers are known to be optically birefringent and exhibit different refractive indices for light with different polarizations. Often, fiber birefringence is characterized along two orthogonal principal directions. Causes for such birefringence in fibers include, among others, imperfect circular core and unbalanced stresses in a fiber along different transverse directions. Notably, the axis of birefringence of the optical fiber may change randomly over time. This random nature in the SOP of light can render implementations of polarization multiplexing difficult, if not possible.

This application includes implementations and examples of devices and techniques for demultiplexing polarization multiplexed optical signals in a simple hardware environment, based on simple signal processing with a feedback control, and based on generally optical processing and control of the optical signal at the receiver to provide reliable demultiplexing at a high speed and a relative low cost.

In one implementation, a device for demultiplexing polarization multiplexed channels in an optical signal can include a polarization beam splitter to receive an optical signal and split the received optical signal into a first beam in a first polarization and a second beam in a polarization orthogonal to the first polarization. The received optical signal carries first and second signal channels via polarization multiplexing and is originally created by combining two optical beams with mutually orthogonal polarizations and unequal amplitudes which are modulated to carry the first and second signal channels, respectively. A first optical detector is provided to convert the first beam into a first electrical signal and a second optical detector is provided to convert the second beam into a second electrical signal. This device uses a control circuit to obtain a differential signal representative of a difference between the first and second beams and being a function of a relative angle between a polarization direction of the polarization beam splitter and a polarization in the received optical signal. This device further includes a polarization controller placed in an input optical path of the optical polarization beam splitter. The polarization controller is used to adjust a polarization of the received optical signal in response to the differential signal to set the difference to be either at a positive maximum or a negative maximum to make the first and second electrical signals to represent the two signal channels.

In another implementation, a demultiplexing method is described as follows. A polarization multiplexed optical signal is split into a first beam and a second beam with mutually orthogonal polarizations. The polarization multiplexed optical signal carries first and second signal channels via polarization multiplexing and is originally created by combining two optical beams with mutually orthogonal polarizations and unequal amplitudes which are modulated to carry the first and second signal channels, respectively. The first beam and the second beam are converted into first and second electrical signals, respectively. A difference between the first and second electrical signals is obtained as a function of an angle of a state of polarization of one of the two orthogonal polarizations in the received optical signal. The state of polarization of the received optical signal is adjusted prior to the splitting to make the difference between the first and second electrical signals at either a positive maximum or a negative minimum. After the difference is set, one of the first and second electrical signals is used as one signal channel and another is used as another signal channel, thus demultiplexing the two signals channels in the received optical signal.

These and other implementations and applications are described in greater detail in the attached drawings, the detailed description, and the claims.

DETAILED DESCRIPTION

Figure 1:
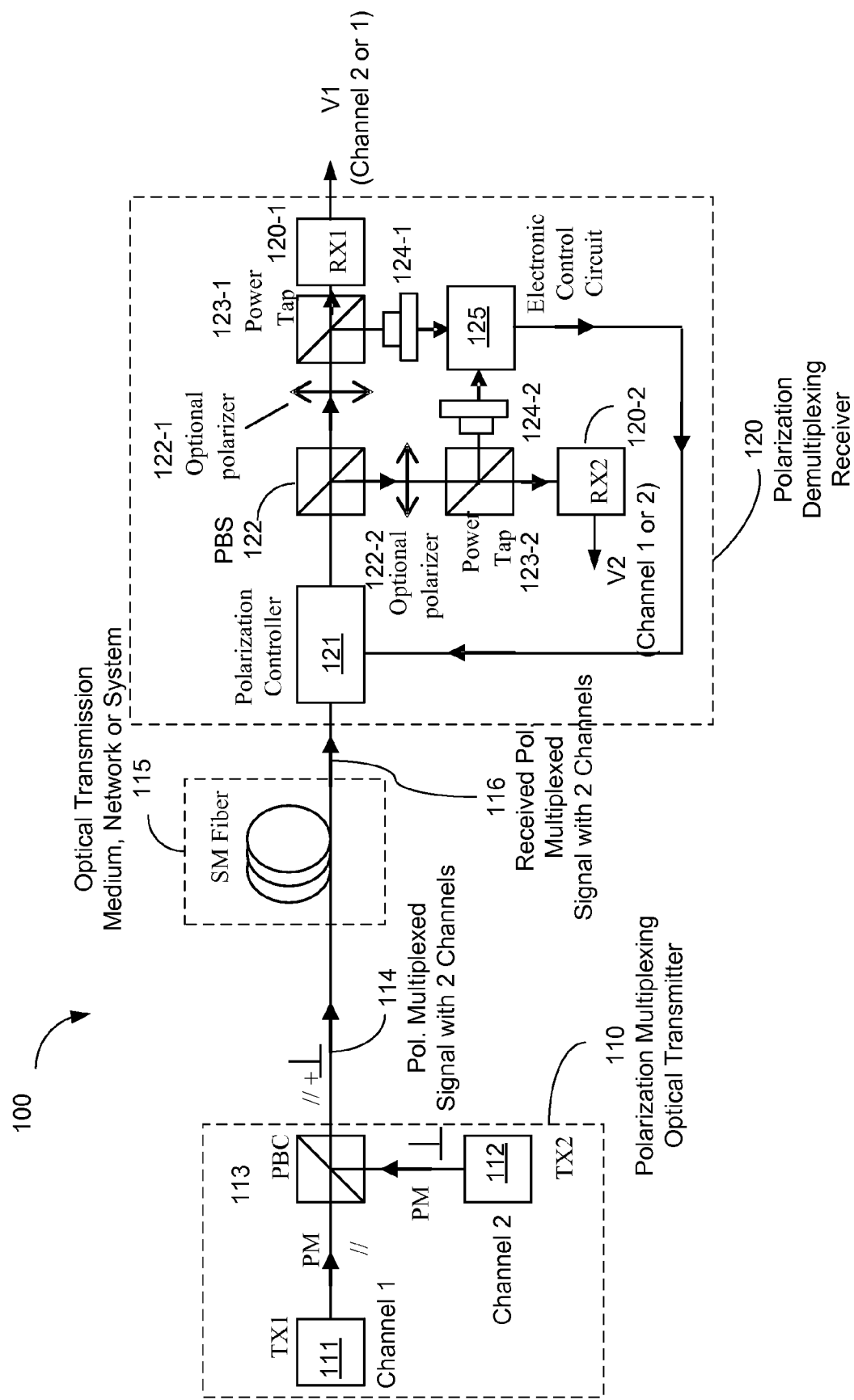
FIG. 1 shows an exemplary optical polarization multiplexing communication system implementing polarization demultiplexing described in this application.

The demultiplexing techniques described in this application can be used in a polarization multiplexing optical communication system. FIG. 1 shows one example 100 which includes a polarization multiplexed optical transmitter 110, an optical transmission medium, network, or system 115 which may be a fiber link, and a polarization demultiplexing optical receiver 120. The transmitter 110 is used to produce a multiplexed optical signal 114 which carries first and second signal channels (channels 1 and 2) via polarization multiplexing. The optical transmitter 110 as illustrated includes a first device such as a first optical transmitter TX1 (111) to generate a first initial optical beam in a first polarization to carry the first signal channel (channel 1), a second device such as a second optical transmitter TX2 (112) to generate a second initial optical beam in a first polarization orthogonal to the first polarization to carry the second signal channel, and a third device 113 such as a polarization beam splitting cube (PBC) to combine the first and second initial optical beams to form the multiplexed optical signal 114. One example for two mutually orthogonal polarizations is two mutually perpendicular linear polarizations, which are illustrated in FIG. 1. Two mutually orthogonal polarizations may be in polarizations other than linear polarizations, e.g., circular polarizations or elliptical polarizations.

In FIG. 1, the amplitudes of the two optical beams in orthogonal polarizations that are produced by the two different transmitters 111 and 112 and combined at the PBC 113 are different and should be kept different which is generally true in practical devices unless they are equalized on purpose. In addition, the optical phases of the two beams should be independent from each other without a fixed phase relationship and can often vary with time. If the two beams are extracted from the same beam or from a common laser, then the phase of one beam should be scrambled relative to the other beam. Alternatively, one of the beams should be delayed with respect to the other one with the relative delay larger than the coherence length of the laser. Polarization maintaining (PM) fibers may be used to carry the beams in the transmitter 110. Other optical transmitters may also be used using other methods to produce the polarization multiplexed signal 114.

After transmitting through the optical link 115, the polarization multiplexed signal 114 becomes a polarization multiplexed signal 116 which still carries the two different signal channels (i.e., channels 1 and 2) but the polarization states of the two channels are unknown due to propagation in the link 115. To a certain extent, the polarization states in the signal 116 may appear random and hence the two signal channels may seemingly be scrambled due to the randomness or fluctuations of the polarization states. The optical receiver 120 is designed to recover or demultiplex the two polarization multiplexed signal channels from the signal 115 in an efficient and simple way.

In the illustrated example, optical receiver 120 includes a polarization controller 121 to control the polarization of the signal 116 at entry of a polarization beam splitter 122. Such a polarization controller may be implemented in various configurations and may include multiple adjustable polarization rotators. The polarization beam splitter 122 receives the signal 115 from the controller 121 and splits the received optical signal into a first beam in a first received polarization and a second beam in a polarization orthogonal to the first received polarization. Two optional optical polarizers 122-1 and 122-2 may be used to respectively filter the two beams to ensure their mutual orthogonal nature of the polarizations. Next, the receiver 120 uses a first optical detector RX1 (120-1) to convert the first beam into a first electrical signal (V1) and a second optical detector RX2 (120-2) to convert the second beam into a second electrical signal (V2). The signals V1 and V2 are then used to control the polarization controller 121 to set the difference between V1 and V2 at a positive maximum or a negative minimum. After the difference is set, the signals V1 and V2 represent the two signal channels, respectively, and the polarization demultiplexing is completed.

A control circuit 125 is used in the receiver 120 to obtain a differential signal representative of the difference between the first and second beams (of the signals V1 and V2) and the receiver 200 is designed to make the differential signal as a function of a relative angle between a polarization direction of the polarization beam splitter 122 and a polarization in the received optical signal from the polarization controller 121. The polarization controller 121, placed in an input optical path of the optical polarization beam splitter 122 and to adjust a polarization of the received optical signal in response to the differential signal to set the difference to be either at a positive minimum or a negative maximum to make the first and second electrical signals V1 and V2 to represent to two signal channels.

The circuit 125 can produce the differential signal in two different ways. The first way is illustrated in FIG. 1 where two optical tap splitters 123-1 and 123-2 are used in the paths of the two beams, respectively, to split a fraction of the two beams to generate first and second monitor beams. A first monitor detector 124-1 is used to convert the first monitor beam into a first electrical monitor signal and a second monitor detector 124-2 is used to convert the second monitor beam into a second electrical monitor signal. The two monitor signals are basically representative of the signals V1 and V2 and are fed into the control circuit 125 to produce the differential signal. Electrical amplifiers may be used to amplify the signals received by the circuit 125.

Figure 3:
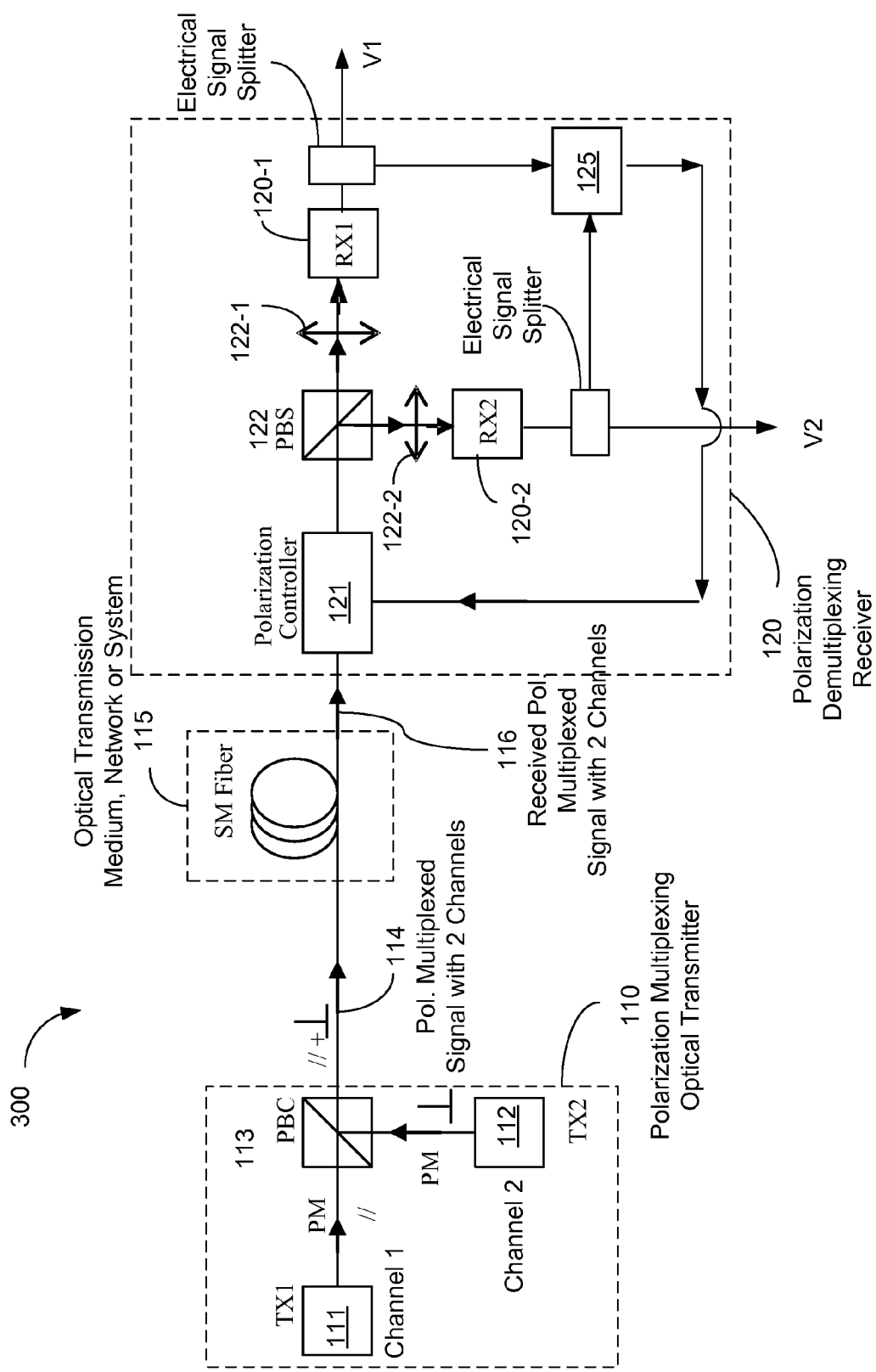
FIG. 3 shows an example of an alternative optical polarization multiplexing communication system that implements polarization demultiplexing described in this application.

Alternatively, the signals V1 and V2 respectively produced by the detectors 120-1 and 120-2 may be split to produce the two monitor signals for processing by the circuit 125. In this design, the optical tap splitters 123-1 and 123-2 and the monitor optical detectors 124-1 and 124-2 are no longer needed. Two electrical signal splitters may be used to produce the monitor signals. Referring to FIG. 3, the control circuit 125 processes the monitor signals from the two electrical signal splitters and adjusts the polarization controller 121 to set the difference between the signals V1 and V2 to be at either the positive maximum or the negative maximum. In one implementation, two bias T splitters may be used to split the monitor signals from the signals V1 and V2. Because only the average optical power level of the differential signal (V1-V2) is used for controlling the polarization controller 121 for the polarization demultiplexing, the bias T may be used to split out the DC or low frequency part of the signal V1 or V2 as the monitor signal while the remaining signal from the bias T has high frequency components which carry the signal channel and are used for data extraction or other operation on the signal channel.

Notably, the above demultiplexing does not need to monitor the polarization state of the received optical signal at the receiver 120 and provides a simple method to demultiplex two polarization channels by complete optical means, which results in high speed operation and low cost. The average optical power levels from TX1 and TX2 are different and the average power levels in the output two arms of the PBS 122 at the receiving end are monitored to achieve nearly perfect demultiplexing without ambiguity.

Figure 2:
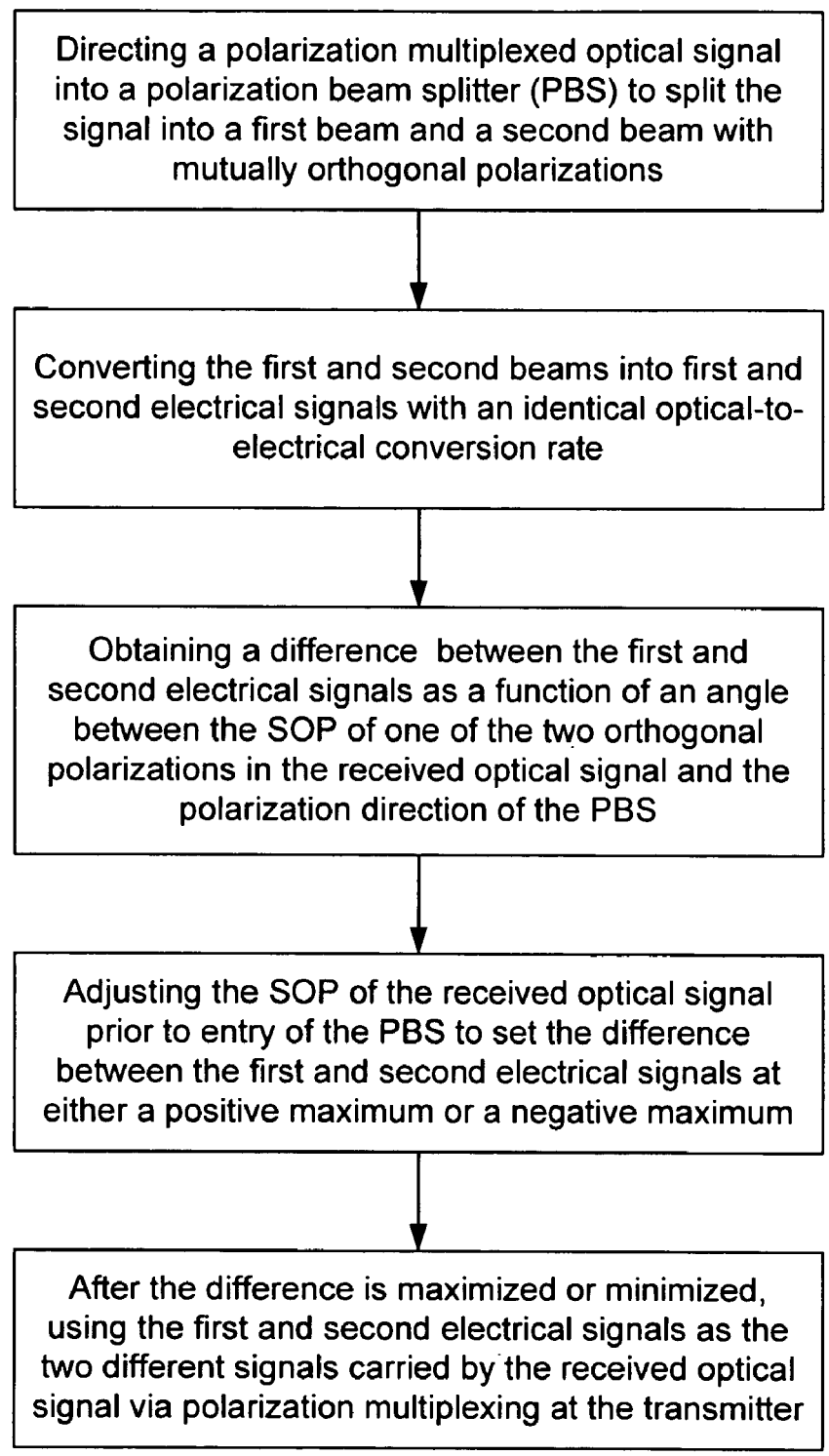
FIG. 2 illustrates an example of the operational flow of the demultiplexing in the receiver of FIG. 1.

FIG. 2 illustrates one example of the operational flow of the receiver 120 in FIG. 1. The details of the operation are described in the following sections.

The electrical fields emitted by the TX1 and TX2 can be expressed as:

$$\vec{E}_1 = A_1 e^{i\phi_1(t)} \hat{x}$$

$$\vec{E}_2 = A_2 e^{i\phi_2(t)} \hat{y}$$

where $A_1$ and $A_2$ are the timing varying amplitudes and are different from each other; $\phi_1$ and $\phi_2$ are the time varying phases of the two signals, respectively and are independent of each other. This can be done, e.g., by using two different lasers as the TX1 111 and TX2 112 so there is no phase relationship between them. The output polarization multiplexed signal out of the transmitter 110, which propagates through the link 115 (e.g., a single mode fiber), can be expressed as the sum of the two orthogonally polarized components carrying two different signal channels:

$$\vec{E} = A_1 e^{i\phi_1(t)} \hat{x} + A_2 e^{i\phi_2(t)} \hat{y}$$

The transmission functions of the polarization beam splitter (PBS) 122 at the receiver 120 for the two channels can be expressed as:

$$\vec{T}_1 = \cos\theta \hat{x} + \sin\theta \hat{y}$$

$$\vec{T}_2 = \sin\theta \hat{x} - \cos\theta \hat{y}$$

wherein the angle $\theta$ is the relative angle between the polarization of light and the polarization direction of the PBS 122 in the receiver 120. The optical power at two output arms of the PBS 122 can be calculated as $$P_i = |\vec{E} \cdot \vec{T}_i|^2$$

$$P_2 = |(A_1 e^{i\phi_1}\hat{x} + A_2 e^{i\phi_2}\hat{y}) \cdot (\sin\theta\hat{x} - \cos\theta\hat{y})|^2 = A_1^2 \sin^2\theta + A_2^2 \cos^2\theta - A_1 A_2 \sin 2\theta \cos[\phi_1(t) - \phi_2(t)]$$

$$P_2 = |(A_1 e^{i\phi_1}\hat{x} + A_2 e^{i\phi_2}\hat{y}) \cdot (\sin\theta\hat{x} - \cos\theta\hat{y})|^2 = A_1^2 \sin^2\theta + A_2^2 \cos^2\theta + A_1 A_2 \sin 2\theta \cos[\phi_1(t) - \phi_2(t)]$$

where subscript i is 1 and 2 to denote the two output arms of the PBS 122, respectively. Because $\phi_1$ and $\phi_2$ have no phase relationship, the term $\cos(\phi_1 - \phi_2)$ varies rapidly and averages to zero in a slow photodetector. Consequently, the powers in the two arms are:

$$P_1 = A_1^2 \cos^2\theta + A_2^2 \sin^2\theta$$

$$P_2 = A_1^2 \sin^2\theta + A_2^2 \cos^2\theta$$

The photovoltages generated in the corresponding tap detectors 124-1 and 124-2 are:

$$V_1 = \alpha_1 (A_1^2 \cos^2\theta + A_2^2 \sin^2\theta)$$

$$V_2 = \alpha_2 (A_1^2 \sin^2\theta + A_2^2 \cos^2\theta)$$

where $\alpha_1$ and $\alpha_2$ are proportional constants taking into account of splitting ratios of the power taps, the responsivity of the photodetectors, and electronic amplifier gains of the corresponding channels. The difference of the two voltages yields:

$$V_1 - V_2 = (\alpha_1 A_1^2 - \alpha_2 A_2^2)\cos^2\theta - (\alpha_2 A_1^2 - \alpha_1 A_2^2)\sin^2\theta$$

The gain of the amplifiers for amplifying the signals V1 and V2 may be adjusted such that $\alpha_1$ and $\alpha_2$ are equal. In this case, the voltage difference or the differential signal (V1-V2) becomes:

$$\Delta V = V_1 - V_2 = \alpha \cdot (A_1^2 - A_2^2)(\cos^2\theta - \sin^2\theta) = 2\alpha(A_1^2 - A_2^2)\cos 2\theta$$

which is a function of the angle $\theta$.

Therefore, as long as the powers from TX1 and TX2 are not equal, A1≠A2, the voltage difference between the two power monitors strongly depends on the relative orientation angle $\theta$ between the PBS 122 and the SOP of the two signals. By feeding the differential signal $\Delta V$ back to the polarization controller 121 to adjust the relative orientation angle to achieve either the positive maximum ($\theta$=0) or negative maximum ($\theta$=180°), the two channels can be effectively separated. It is interesting to note that, in the example shown in FIG. 1, when $\Delta V$ is maximum, signal from TX1 goes to RX1 while signal from TX2 goes to RX2. When $\Delta V$ is negative maximum, signal from TX1 goes to RX2 while signal from TX2 goes to RX1.

When $\alpha_1$ and $\alpha_2$ are equal, then $$V_1 + V_2 = \alpha(A_1^2 + A_2^2) = \cos \tan t$$

Therefore, by measuring $V_1 + V_2$, one can ensure that the gains of the two channels are properly set.

The above polarization multiplexing may be used in combination with wavelength-division multiplexing (WDM) to further expand the capacity of a WDM system. Each WDM channel at a WDM wavelength can be used to carry two different channels based on the present polarization multiplexing. Hence, two or more multiplexed optical signals at different WDM wavelengths each carrying two polarization multiplexed signal channels can be generated and sent through a common fiber link to a destination. At the destination, the multiplexed optical signals at different wavelengths can be separate into separate multiplexed optical signals. Each of separate multiplexed optical signals is then processed based on the above demultiplexing process to demultiplex two signals channels therein.

The above techniques for implementing polarization multiplexing and demultiplexing are simple in their hardware designs and in operation. A simple feedback is used to adjust the polarization of the received light to set the differential signal at a positive maximum or negative maximum. The optical receiver 120 does not need to perform complex signal processing tasks. Notably, the present techniques do not require any special features in optical transmitters or receivers. As such, a wide range of optical transmitters and receivers, including commercial transmitters and receivers for WDM systems, may be used, without any change or modification, to implement the present polarization multiplexing and demultiplexing. As an example, existing optical transmitters and receivers in the existing optical communication systems can be used without change so that a carrier can deploy polarization multiplexing and demultiplexing described in this application to double its communication capacity with a significantly reduced effort, cost, and time in comparison with deployment of other polarization multiplexing and demultiplexing systems which may require specialized and proprietary optical transmitters and receivers and complex demultiplexing systems.

The present polarization demultiplexing scheme is essentially performed in the optical domain by controlling the polarization of the received polarization multiplexed signal. Hence, the implementation of this demultiplexing scheme does not require any changes in electronic hardware of an existing system.

Only a few examples and implementations are described. However, other implementations, variations, modifications, and enhancements are possible.

What is claimed is:

1. A device, comprising:
a polarization beam splitter to receive an optical signal and split the received optical signal into a first beam in a first polarization and a second beam in a polarization orthogonal to the first polarization, wherein the received optical signal carries first and second signal channels via polarization multiplexing and is originally created by combining two optical beams with mutually orthogonal polarizations and unequal amplitudes which are modulated to carry the first and second signal channels, respectively;
a first optical detector to convert the first beam into a first electrical signal;
a second optical detector to convert the second beam into a second electrical signal;
a control circuit to obtain a differential signal representative of a difference between the first and second beams and being a function of a relative angle between a polarization direction of the polarization beam splitter and a polarization in the received optical signal; and
a polarization controller placed in an input optical path of the optical polarization beam splitter and to adjust a polarization of the received optical signal in response to the differential signal to set the difference to be either at a positive maximum or a negative maximum to make the first and second electrical signals represent the two signal channels.

2. The device as in claim 1, further comprising:
a first optical splitter between the optical polarization beam splitter and the first optical detector to split a fraction of the first beam as a first monitor beam;
a first monitor optical detector to convert the first monitor beam into a first monitor electrical signal representative of the first electrical signal;
a second optical splitter between the optical polarization beam splitter and the second optical detector to split a fraction of the second beam as a second monitor beam; and
a second monitor optical detector to convert the second monitor beam into a second monitor electrical signal representative of the second electrical signal,
wherein the control circuit operates on the first and second monitor electrical signals to generate the differential signal.

3. The device as in claim 1, wherein the control circuit receives a fraction of the first electrical signal as a first monitor electrical signal, and a fraction of the second electrical signal as a second monitor electrical signal, and wherein the control circuit operates on the first and second monitor electrical signals to generate the differential signal.

4. The device as in claim 3, further comprising:
a first signal splitter to split DC and low frequency components in the first electrical signal as the first monitor electrical signal; and
a second signal splitter to split DC and low frequency components in the second electrical signal as the second monitor electrical signal.

5. A method, comprising:
splitting a polarization multiplexed optical signal into a first beam and a second beam with mutually orthogonal polarizations, wherein the polarization multiplexed optical signal carries first and second signal channels via polarization multiplexing and is originally created by combining two optical beams with mutually orthogonal polarizations and unequal amplitudes which are modulated to carry the first and second signal channels, respectively;
converting the first beam and the second beam into first and second electrical signals, respectively;
obtaining a difference between the first and second electrical signals as a function of an angle of a state of polarization of one of the two orthogonal polarizations in the received optical signal;
adjusting the state of polarization of the received optical signal prior to the splitting to make the difference between the first and second electrical signals at either a positive maximum or a negative maximum; and
after the difference is set, using one of the first and second electrical signals as one signal channel and another as another signal channel, thus demultiplexing the two signals channels in the received optical signal.

6. The method as in claim 5, further comprising:
generating a first initial optical beam in a first polarization to carry the first signal channel;
generating a second initial optical beam in a second polarization orthogonal to the first polarization to carry the second signal channel; and
combining the first and second initial optical beams to form the multiplexed optical signal.

7. The method as in claim 6, further comprising:
directing the multiplexed optical signal through an optical link prior to being split into the first and second beams for demultiplexing the first and second signal channels.

8. The method as in claim 5, further comprising:
generating two or more other multiplexed optical signals at different optical wavelengths each carrying two polarization multiplexed signal channels;
transmitting the multiplexed optical signals at different wavelengths as a wavelength-division multiplexed signal through a fiber link to a destination;
at the destination, separating the multiplexed optical signals at different wavelengths into separate multiplexed optical signals; and
processing each of separate multiplexed optical signals to demultiplex two signals channels therein.

9. A system, comprising:
an optical transmitter to produce a multiplexed optical signal which carries first and second signal channels via polarization multiplexing;
an optical link to transmit the multiplexed optical signal from the optical transmitter to a destination; and
an optical receiver at the destination to receive and process the multiplexed optical signal to demultiplex the first and second signal channels,
wherein the optical transmitter comprises a first device to generate a first initial optical beam in a first polarization to carry the first signal channel, a second device to generate a second initial optical beam in a first polarization orthogonal to the first polarization to carry the second signal channel, and a third device to combine the first and second initial optical beams to form the multiplexed optical signal, and
wherein the optical receiver comprises:
a polarization beam splitter to receive an optical signal and split the received optical signal into a first beam in a first received polarization and a second beam in a polarization orthogonal to the first received polarization,
a first optical detector to convert the first beam into a first electrical signal, a second optical detector to convert the second beam into a second electrical signal, a control circuit to obtain a differential signal representative of a difference between the first and second beams and being a function of a relative angle between a polarization direction of the polarization beam splitter and a polarization in the received optical signal, and a polarization controller placed in an input optical path of the optical polarization beam splitter and to adjust a polarization of the received optical signal in response to the differential signal to set the difference to be either at a positive maximum or a negative maximum to make the first and second electrical signals represent the two signal channels.

10. The system as in claim 9, wherein the optical receiver further comprises:

a first optical splitter between the optical polarization beam splitter and the first optical detector to split a fraction of the first beam as a first monitor beam;

a first monitor optical detector to convert the first monitor beam into a first monitor electrical signal representative of the first electrical signal;

a second optical splitter between the optical polarization beam splitter and the second optical detector to split a fraction of the second beam as a second monitor beam; and a second monitor optical detector to convert the second monitor beam into a second monitor electrical signal representative of the second electrical signal, wherein the control circuit operates on the first and second monitor electrical signals to generate the differential signal.

11. The system as in claim 9, wherein the control circuit receives a fraction of the first electrical signal as a first monitor electrical signal, and a fraction of the second electrical signal as a second monitor electrical signal, and wherein the control circuit operates on the first and second monitor electrical signals to generate the differential signal.

12. The device as in claim 11, wherein the optical receiver further comprises:

a first signal splitter to split DC and low frequency components in the first electrical signal as the first monitor electrical signal; and a second signal splitter to split DC and low frequency components in the second electrical signal as the second monitor electrical signal.

13. The method as in claim 6, wherein the first and the second initial optical beams have different amplitudes and optical phases that are independent from each other.

14. The method as in claim 13, comprising using two different optical transmitters to generate the first and the second initial optical beams.

15. The method as in claim 13, comprising splitting a common optical beam to generate the first and the second initial optical beams, and scrambling phases of the first and the second initial optical beams with respect to each other.

16. The system as in claim 9, wherein the optical transmitter is configured to combine a first optical beam modulated to carry the first signal channel and a second optical beam modulated to carry the second signal channel, wherein the first and the second optical beams have orthogonal polarizations, independent phases relative to each other and different optical amplitudes.

17. A method for optically communicating based on polarization division multiplexing, comprising:

generating a first initial optical beam in a first polarization to carry a first signal channel, and a second initial optical beam in a second polarization orthogonal to the first polarization to carry a second signal channel, wherein the first and second initial optical beams have different optical amplitudes and different phases that are independent from each other;

combining the first and second initial optical beams to form a multiplexed optical signal;

transmitting the multiplexed optical signal via an optical transmission media to a destination;

at the destination, using a polarization controller to receive the multiplexed optical signal and to control the polarization of the received multiplexed optical signal;

splitting the multiplexed optical signal output by the polarization controller into a first beam in a first received polarization and a second beam in a polarization orthogonal to the first received polarization;

obtaining a differential signal representative of a difference between optical power levels of the first and second beams; and controlling the polarization controller to adjust a polarization of the received the multiplexed optical signal in response to the differential signal to set the difference to be either at a positive maximum or a negative to make the first and beams to carry the two signal channels, respectively, thus achieving polarization demultiplexing.

18. The method as in claim 17, comprising:

using a first optical detector to convert the first beam into a first electrical signal and a second optical detector to convert the second beam into a second electrical signal; and using the first and second electrical signals to obtain the differential signal.

19. The method as in claim 17, comprising:

using a first optical splitter to split the first beam into a first optical monitor beam and a first optical signal beam;

using a second optical splitter to split the second beam into a second optical monitor beam and a second optical signal beam;

using the first and second optical monitor beams to obtain the differential signal; and using the first and second optical signal beams to obtain the first and second signal channels.

20. The method as in claim 17, wherein the differential signal is obtained from a difference between an averaged optical power level of the first beam and an averaged optical power level of the second beam.

* * * * *